(12) United States Patent
Shahvirdi Dizaj Yekan

(10) Patent No.: US 11,867,830 B2
(45) Date of Patent: Jan. 9, 2024

(54) SIDE LOBE REDUCTION IN A BEAM STEERING VEHICLE RADAR ANTENNA FOR OBJECT IDENTIFICATION

(71) Applicant: Metawave Corporation, Carlsbad, CA (US)

(72) Inventor: Taha Shahvirdi Dizaj Yekan, San Diego, CA (US)

(73) Assignee: Metawave Corporation, Carlsbad, CA (US)

( * ) Notice: Subject to any disclaimer, the term of this patent is extended or adjusted under 35 U.S.C. 154(b) by 239 days.

(21) Appl. No.: 16/776,393

(22) Filed: Jan. 29, 2020

(65) Prior Publication Data
US 2020/0241109 A1 Jul. 30, 2020

Related U.S. Application Data

(60) Provisional application No. 62/798,367, filed on Jan. 29, 2019.

(51) Int. Cl.
*G01S 7/28* (2006.01)
*G01S 13/44* (2006.01)
*G01S 7/41* (2006.01)
*G01S 13/931* (2020.01)
*G01S 13/42* (2006.01)

(52) U.S. Cl.
CPC .............. *G01S 7/2813* (2013.01); *G01S 7/41* (2013.01); *G01S 13/426* (2013.01); *G01S 13/44* (2013.01); *G01S 13/931* (2013.01)

(58) Field of Classification Search
CPC .......... G01S 13/02; G01S 13/34; G01S 13/44; G01S 13/422; G01S 13/426; G01S 13/865; G01S 13/867; G01S 13/931; G01S 7/41; G01S 7/2813; G01S 2013/0254;
(Continued)

(56) References Cited

U.S. PATENT DOCUMENTS

| 6,195,062 B1 * | 2/2001 | Killen ..................... H01Q 5/49 343/795 |
| 6,492,949 B1 | 12/2002 | Breglia et al. |

(Continued)

OTHER PUBLICATIONS

J. Ala-Laurinaho et al., "2-D Beam-Steerable Integrated Lens Antenna System for 5G E-Band Access and Backhaul," in IEEE Transactions on Microwave Theory and Techniques, vol. 64, No. 7, pp. 2244-2255, Jul. 2016.

(Continued)

*Primary Examiner* — Peter M Bythrow

(57) ABSTRACT

Examples disclosed herein relate to a beam steering vehicle radar for object identification. The radar includes a radar module having at least one beam steering transmit antenna to radiate one or more radio frequency ("RF") beams in a plurality of directions, at least one beam steering receive antenna to receive one or more RF return signals, and a transceiver to generate radar data capturing a surrounding environment from the one or more received RF return signals. The radar also includes a perception module configured to detect and identify an object in the surrounding environment from the radar data. At least one of the beam steering transmit antenna has a side lobe reduction mechanism formed within a substrate to reduce side lobes in the radiated one or more RF beams.

19 Claims, 7 Drawing Sheets

(58) Field of Classification Search
CPC . G01S 2013/93271; G01S 2013/93272; G01S 2013/93273; G01S 2013/93274
See application file for complete search history.

(56) References Cited

U.S. PATENT DOCUMENTS

| | | | | |
|---|---|---|---|---|
| 6,958,729 | B1* | 10/2005 | Metz | H01Q 3/26 343/753 |
| 7,298,333 | B2* | 11/2007 | Iluz | H01Q 21/065 343/846 |
| 10,205,457 | B1 | 2/2019 | Josefsberg et al. | |
| 2009/0251362 | A1* | 10/2009 | Margomenos | G01S 13/931 342/175 |
| 2015/0255870 | A1* | 9/2015 | Okunaga | H01Q 13/206 343/700 MS |
| 2018/0128913 | A1* | 5/2018 | Bialer | G01S 13/89 |
| 2019/0033439 | A1* | 1/2019 | Gu | G01S 7/415 |

OTHER PUBLICATIONS

S. Patole et al., "Automotive Radars: A Review of Signal Processing Techniques," Signal Processing for Smart Vehicle Technologies: Part 2 in IEEE Signal Processing Magazine, pp. 22-35, Mar. 2017.

S.-H. Jeong, et al., "A Multi-Beam and Multi-Range Radar With Fmcw and Digital Beam Forming for Automotive Applications," Progress in Electromagnetics Research, vol. 124, pp. 285-299, 2012.

D.-S. Kim et al., "A Design of Switch Array Antenna with Performance Improvement for 77 GHz Automotive FMCW Radar," Progress In Electromagnetics Research B, vol. 66, 107-121, 2016.

R. Rouveure et al., "Radar Imager for Perception and Mapping in Outdoor Environments," Advanced Concepts for Intelligent Vision Systems: 11th International Conference (ACIVS), Bordeaux, France, pp. 618-628, Sep. 2009.

S. Carpenter, "Autonomous Vehicle Radar: Improving Radar Performance with Simulation," White Paper, High Frequency/Electronics Business Unit, ANSYS, Canonsburg, PA, pp. 1-14, 2017.

H. Zhou et al., "Evolution of Satellite Communication Antennas on Mobile Ground Terminals," International Journal of Antennas and Propagation, vol. 2015, Article ID 436250, pp. 1-14, Jul. 2015.

J. Schoebe et al., "Planar Antenna Technology for mm-Wave Automotive Radar, Sensing, and Communications," Radar Technology, Book edited by: Dr. Guy Kouemou, ISBN 978-953-307-029-2, In Tech, Ch. 15, pp. 298-319, Jan. 2010.

S. Haykin, "Radar Vision," IEEE International Conference on Radar, Arlington, VA, pp. 585-588, May 1990.

"Implementing Digital Processing for Automotive Radar Using SoC FPGAs."White Paper, Altera Corporation, pp. 1-16, Dec. 2013.

* cited by examiner

SIDE LOBE REDUCTION IN A BEAM STEERING VEHICLE RADAR ANTENNA FOR OBJECT IDENTIFICATION

CROSS-REFERENCE TO RELATED APPLICATIONS

This application claims priority from U.S. Provisional Application No. 62/798,367, titled "Method and Apparatus for Side Lobe Reduction Mechanisms for Antennas and Radiating Elements," filed on Jan. 29, 2019, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Side lobe reduction in a beam steering vehicle radar antenna for object identification is disclosed. In systems incorporating antennas and radiating structures, there is a balance between high gain and low side lobes, as these are typically related. The goal is to increase the gain of a main radiation lobe while reducing the size of the side lobes. Reduction of side lobes in a vehicle radar antenna enables the radar to distinguish between signal reflections corresponding to the main lobe from reflections corresponding to side lobes. This clarifies where the object detection is made giving accuracy to the object detection process. The radar disclosed herein is a beam steering radar capable of generating narrow, directed beams that can be steered to any angle (i.e., from 0° to 360°) across a Field of View ("FoV") to detect objects. The beams are generated and steered in the analog domain, while processing of received radar signals for object identification is performed with advanced signal processing and machine learning techniques.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
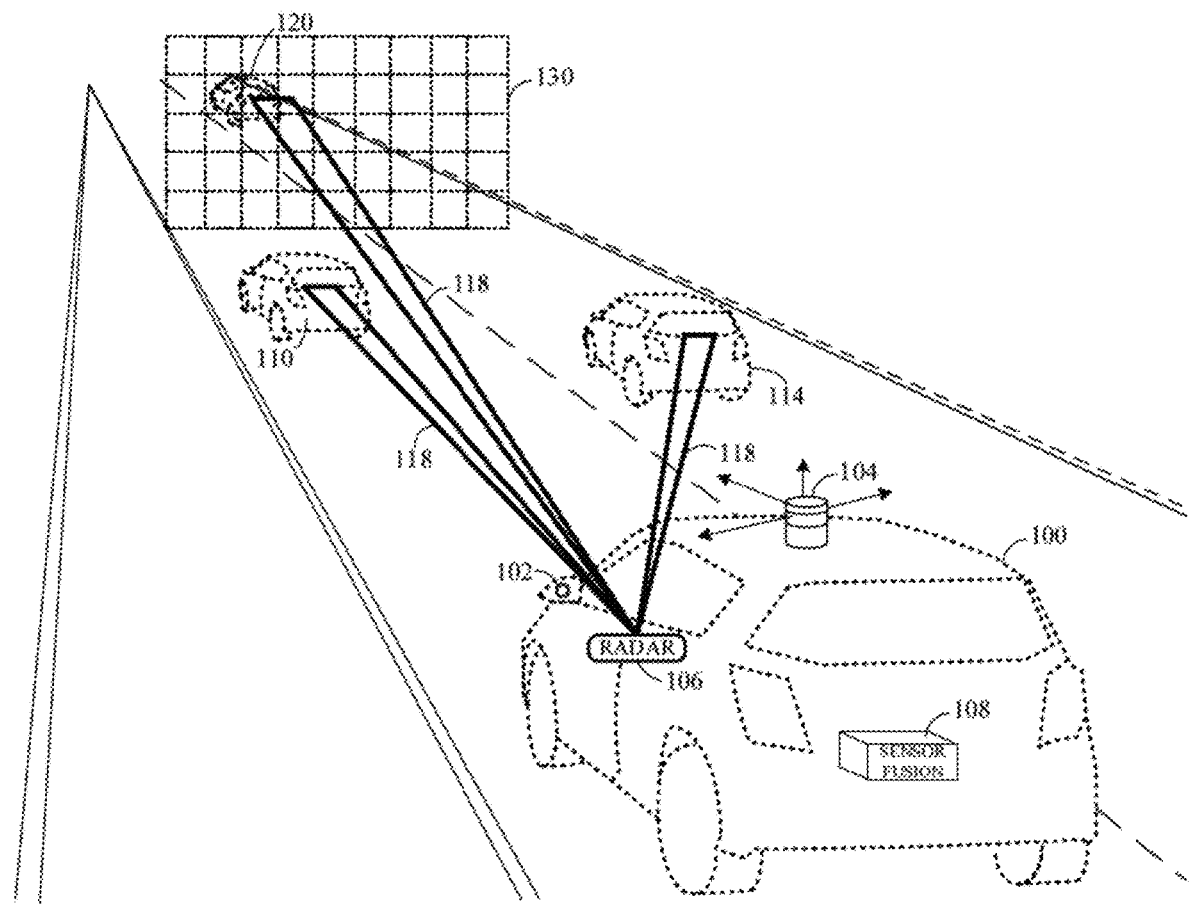
FIG. 1 illustrates an example environment in which a beam steering radar in an autonomous vehicle is used to detect and identify objects, according to various implementations of the subject technology.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100, but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras are able to capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long range capabilities of the radar 106 enable a multi-sensor fusion module 108 in the ego vehicle 100 to enhance its object detection and identification.

As illustrated, the beam steering radar 106 can detect both vehicle 120 at a far range (e.g., greater than 350 m) as well as a vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar ("LRR") mode that enables the detection of long range objects in a very short time to then focus on obtaining finer velocity resolution for the detected vehicles. Although not described herein, radar 106 is capable of time-alternatively reconfiguring between LRR and Short-Range Radar ("SRR") modes. The SRR mode enables a wide beam with lower gain, but is able to make quick decisions to avoid an accident, assist in parking and downtown travel, and capture information about a broad area of the environment. The LRR mode enables narrow, directed beams to reach long distances and at a high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
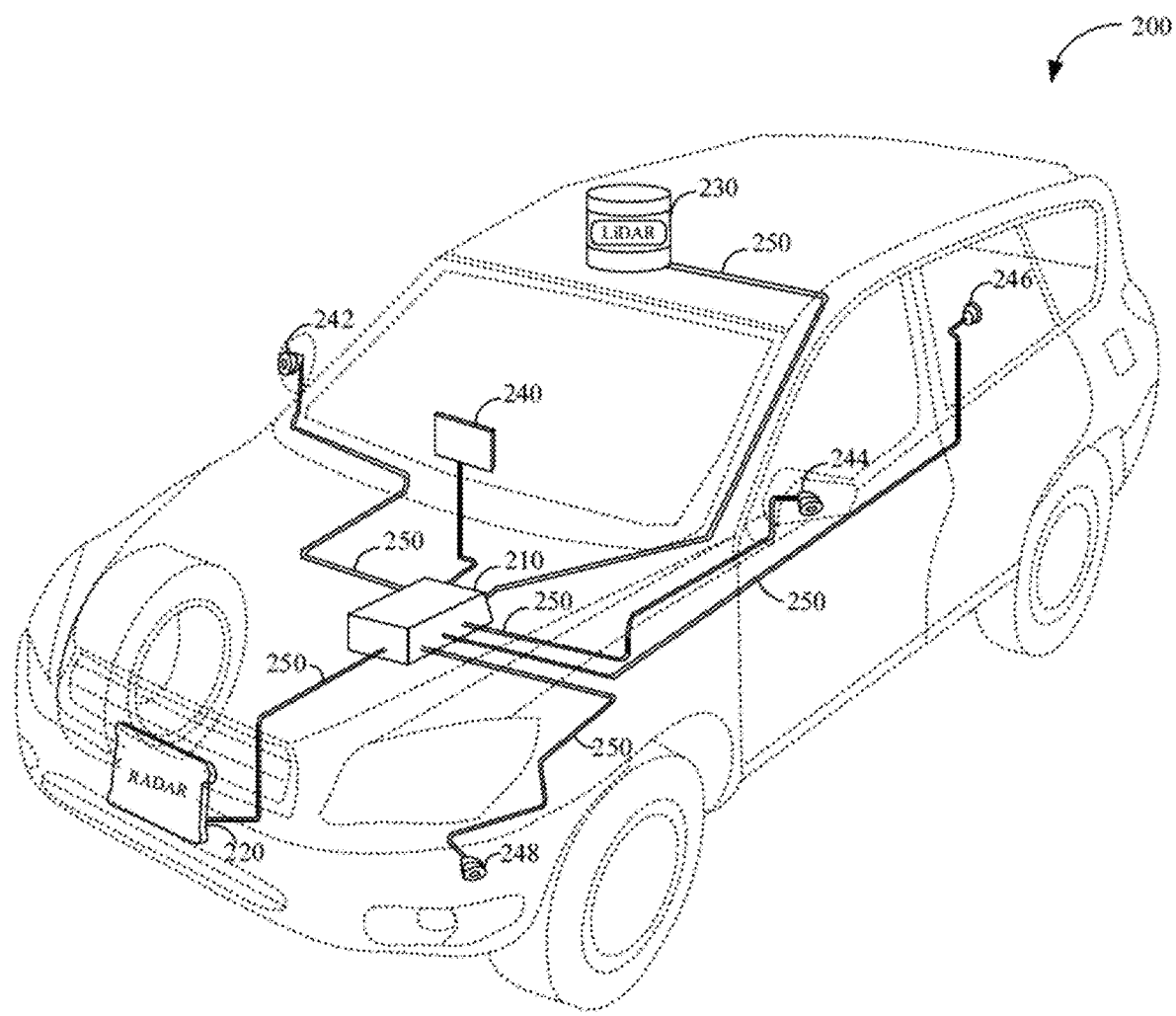
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

The electronic device 210 includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
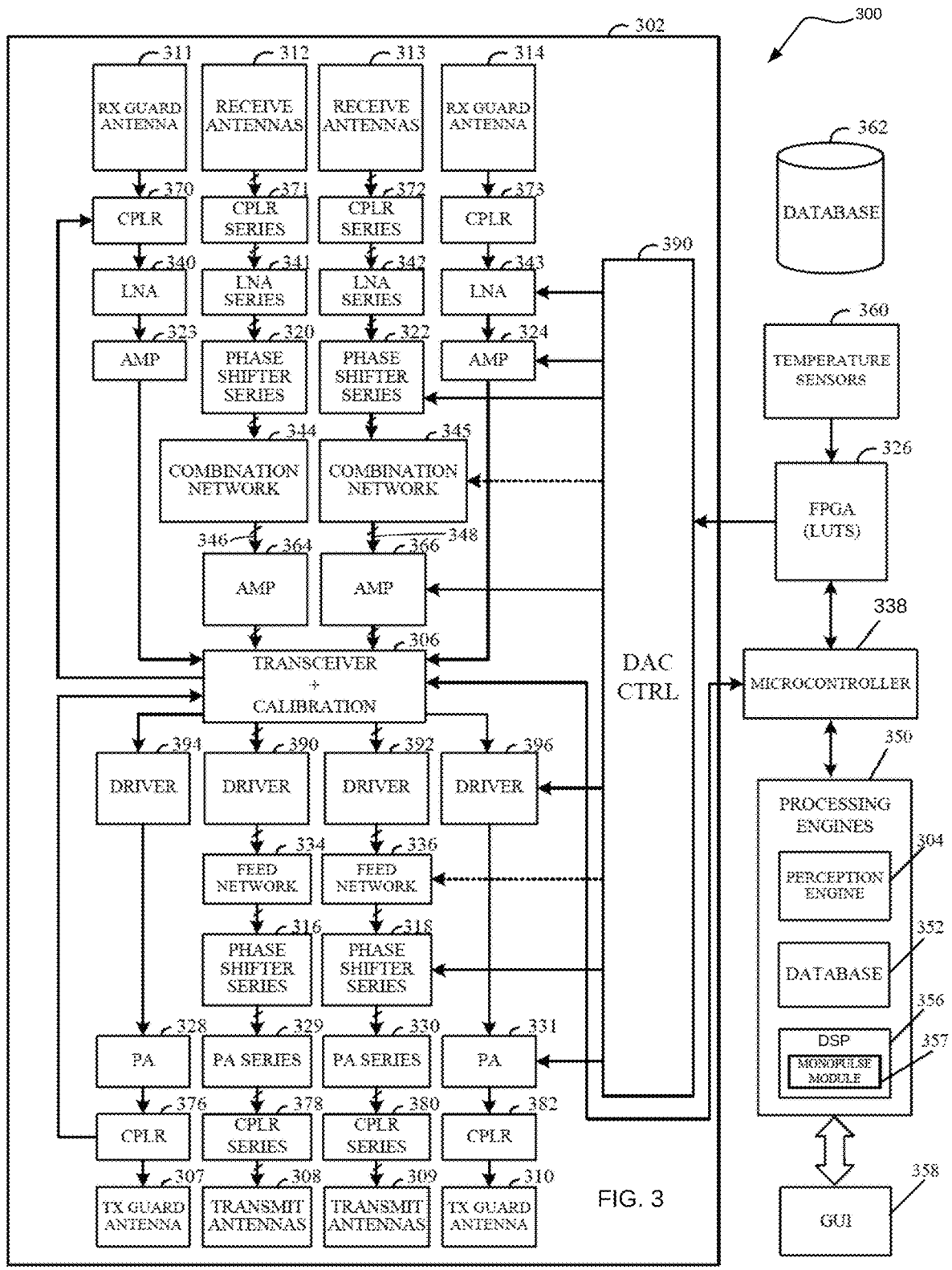
FIG. 3 is a schematic diagram of a beam steering radar system as in FIG. 2 and in accordance with one or more implementations of the subject technology.

FIG. 3 illustrates a schematic diagram of a beam steering radar system implemented as in FIG. 2 in accordance with various examples. Beam steering radar 300 is a "digital eye" with true 3D vision and capable of a human-like interpretation of the world. The "digital eye" and human-like interpretation capabilities are provided by two main modules: radar module 302 and a perception engine 304. Radar module 302 is capable of both transmitting RF signals within a FoV and receiving the reflections of the transmitted signals as they reflect off of objects in the FoV. With the use of analog beam steering in radar module 302, a single transmit and receive chain can be used effectively to form directional, as well as steerable, beams.

The receive chain includes receive antennas 312 and 313, receive guard antennas 311 and 314, optional couplers 370-373, Low Noise Amplifiers ("LNAs") 340-343, Phase Shifter ("PS") circuits 320 and 322, amplifiers (such as Power Amplifiers ("PAs")) 323, 324, 364 and 366, and combination networks 344 and 345. The transmit chain includes drivers 390, 392, 394 and 396, feed networks 334 and 336, PS circuits 316 and 318, PAs 328-331, optional couplers 376, 378, 380 and 382, transmit antennas 308 and 309, and optional transmit guard antennas 307 and 310. The radar module 302 also includes a transceiver 306, a Digital-to-Analog ("DAC") controller 390, a Field-Programmable Gate Array ("FPGA") 326, a microcontroller 338, processing engines 350, a Graphic User Interface ("GUI") 358, temperature sensors 360 and a database 362. The processing engines 350 includes perception engine 304, database 352 and Digital Signal Processing ("DSP") module 356. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In operation, the transceiver 306 in radar module 302 generates signals for transmission through a series of transmit antennas 308 and 309 as well as manages signals received through a series of receive antennas 312 and 313. Beam steering within the FoV is implemented with PS circuits 316 and 318 coupled to the transmit antennas 308 and 309, respectively, on the transmit chain and PS circuits 320 and 322 coupled to the receive antennas 312 and 313, respectively, on the receive chain. Careful phase and amplitude calibration of the transmit antennas 308, 309 and receive antennas 312, 313 can be performed in real-time with the use of couplers integrated into the radar module 302 as described in more detail below. In other implementations, calibration is performed before the radar is deployed in an ego vehicle and the couplers may be removed.

The use of PS circuits 316, 318 and 320, 322 enables separate control of the phase of each element in the transmit antennas 308, 309 and receive antennas 312, 313. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

The major challenge with implementing analog beam steering is to design PSs to operate at 77 GHz. PS circuits 316, 318 and 320, 322 solve this problem with a reflective PS design implemented with a distributed varactor network fabricated using suitable semiconductor materials, such as Gallium-Arsenide (GaAs) materials, among others. Each PS circuit 316, 318 and 320, 322 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 316, 318 and 320, 322 is controlled by an FPGA 326, which provides a series of voltages to the PSs in each PS circuit that results in a series of phase shifts.

The DAC controller 390 is coupled to each of the LNAs 340-343, the amplifiers 323, 324, 364, 366, PS circuits 316, 318, 320, 322, the drivers 390, 392, 394, 396, and the PAs 328-331. In some aspects, the DAC controller 390 is coupled to the FPGA 326, and the FPGA 326 can drive digital signaling to the DAC controller 390 to provide analog signaling to the LNAs 340-343, the amplifiers 323, 324, 364, 366, PS circuits 316, 318, 320, 322, the drivers 390, 392, 394, 396, and the PAs 328-331. In some implementations, the DAC controller 390 is coupled to the combination networks 344, 345 and to the feed networks 334, 336.

In various examples, an analog control signal is applied to each PS in the PS circuits 316, 318 and 320, 322 by the DAC controller 390 to generate a given phase shift and provide beam steering. The analog control signals applied to the PSs in PS circuits 316, 318 and 320, 322 are based on voltage values that are stored in Look-up Tables ("LUTs") in the FPGA 326. These LUTs are generated by an antenna calibration process that determines which voltages to apply to each PS to generate a given phase shift under each operating condition. Note that the PSs in PS circuits 316, 318 and 320, 322 can generate phase shifts at a very high resolution of less than one degree. This enhanced control over the phase allows the transmit and receive antennas in radar module 302 to steer beams with a very small step size, improving the capability of the radar system 300 to resolve closely located targets at small angular resolution. FPGA 326 also has LUTs to store bias voltage values for the LNAs 340-343. As described in more detail below, these bias voltage values can be determined during calibration to control the gain of the LNAs, including to vary the gain of LNAs connected to edge antenna elements of the receive antennas 312-313 in order to lower the side lobe levels of the received beams.

In various examples, each of the transmit antennas 308, 309 and the receive antennas 312, 313 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 308, 309 and the receive antennas 312, 313 may be used to implement specific designs and meet specific constraints.

The transmit chain in the radar module 302 starts with the transceiver 306 generating RF signals to prepare for transmission over-the-air by the transmit antennas 308 and 309. The RF signals may be, for example, Frequency-Modulated Continuous Wave ("FMCW") signals. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, the FMCW signals are fed to drivers 390 and 392. From the drivers 390 and 392, the signals are divided and distributed through feed networks 334 and 336, respectively, which form a power divider system to divide an input signal into multiple signals, one for each element of the transmit antennas 308 and 309, respectively. The feed networks 334 and 336 may divide the signals so power is equally distributed among them or alternatively, so power is distributed according to another scheme, in which the divided signals do not all receive the same power. Each signal from the feed networks 334 and 336 is then input to the PS circuits 316 and 318, respectively, where the FMCW signals are phase shifted based on control signaling from the DAC controller 390 (corresponding to voltages generated by the FPGA 326 under the direction of microcontroller 338), and then transmitted to the PAs 329 and 330. Signal amplification is needed for the FMCW signals to reach the long ranges desired for object detection, as the signals attenuate as they radiate by the transmit antennas 308 and 309. From the PAs 329 and 330, the FMCW signals are fed to couplers 378 and 380, respectively, to generate calibration signaling that is fed back to the transceiver 306. From the couplers 378 and 380, the FMCW signals are transmitted through transmit antennas 308 and 309. Note that couplers 378-380 are used only for real-time calibration purposes and are therefore optional. Note also that, in some aspects, the transceiver 306 feeds the FMCW signals to drivers 394 and 396, which are then fed to PAs 328 and 332 and to the couplers 376 and 382. From these couplers, the FMCW signals are fed to optional transmit guard antennas 307 and 310 for side lobe cancelation of the transmission signal.

The microcontroller 338 determines which phase shifts to apply to the PSs in PS circuits 316, 318, 320 and 322 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308, 309 and the receive antennas 312, 313 can scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 can detect objects at a long distance, e.g., 300 m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312 and 313. The received signaling is then optionally fed to couplers 372 and 373 using feedback calibration signaling from the transceiver 306. The couplers 370, 372-374 can allow probing to the receive chain signal path during real-time calibration. From the couplers 372 and 373, the received signaling is fed to LNAs 341 and 342. The LNAs 341 and 342 are positioned between the receive antennas 312 and 313 and PS circuits 320 and 322, which include PSs similar to the PSs in PS circuits 316 and 318. For receive operation, PS circuits 320 and 322 create phase differentials between radiating elements in the receive antennas 312 and 313 to compensate for the time delay of received signals between radiating elements due to spatial configurations.

Receive phase-shifting, also referred to as analog beamforming, combines the received signals for aligning echoes to identify the location, or position of a detected object. That is, phase shifting aligns the received signals that arrive at different times at each of the radiating elements in receive antennas 312 and 313. Similar to PS circuits 316, 318 on the transmit chain, PS circuits 320, 322 are controlled by the DAC controller 390, which provides control signaling to each PS to generate the desired phase shift. In some aspects, the FPGA 326 can provide bias voltages to the DAC controller 390 to generate the control signaling to PS circuits 320, 322.

The receive chain then combines the signals fed by the PS circuits 320 and 322 at the combination networks 344 and 345, respectively, from which the combined signals propagate to the amplifiers 364 and 366 for signal amplification. The amplified signal is then fed to the transceiver 306 for receiver processing. Note that as illustrated, the combination networks 344 and 345 can generate multiple combined signals 346 and 348, of which each signal combines signals from a number of elements in the receive antennas 312 and 313, respectively. In one example, the receive antennas 312 and 313 include 128 and 64 radiating elements partitioned into two 64-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346 and 348 can carry two RF signals to the transceiver 306, where each RF signal combines signaling from the 64-element and 32-element clusters of the receive antennas 312 and 313. Other examples may include 8, 26, 34, or 62 elements, and so on, depending on the desired configuration. The higher the number of antenna elements, the narrower the beam width. In some aspects, the receive guard antennas 310 and 314 feed the receiving signaling to couplers 370 and 373, respectively, which are then fed to LNAs 340 and 343. The filtered signals from the LNAs 340 and 343 are fed to amplifiers 323 and 324, respectively, which are then fed to the transceiver 306 for side lobe cancelation of the received signals by the receiver processing.

In some implementations, the radar module 302 includes receive guard antennas 310 and 314 that generate a radiation pattern separate from the main beams received by the 64-element receive antennas 312 and 313. The receive guard antennas 310 and 314 are implemented to effectively eliminate side-lobe returns from objects. The goal is for the receive guard antennas 310 and 314 to provide a gain that is higher than the side lobes and therefore enable their elimination or reduce their presence significantly. The receive guard antennas 310 and 314 effectively act as a side lobe filter. Similar, the radar module 302 may optionally include transmit guard antennas 307 and 310 to eliminate side lobe formation or reduce the gain generated by transmitter side lobes at the time of a transmitter main beam formation by the transmit antennas 308 and 309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP module 356 with an ADC module to convert the analog signals from transceiver 306 into digital signals that can be processed by monopulse module 357 to determine angles of arrival and other valuable information for the detection and identification of objects by perception engine 304. In one or more implementations, DSP engine 356 may be integrated with the microcontroller 338 or the transceiver 306.

Radar system 300 also includes a GUI 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 304 controls further operation of the transmit antennas 308 and 309 by, for example, providing an antenna control signal containing beam parameters for the next RF beams to be radiated from the transmit antennas 308-309.

In operation, the microcontroller 338 may, for example, determine the parameters at the direction of perception engine 304, which may at any given time determine to focus on a specific area of a FoV upon identifying targets of interest in the ego vehicle's path or surrounding environment. The microcontroller 338 determines the direction, power, and other parameters of the RF beams and controls the transmit antennas 308 and 309 to achieve beam steering in various directions. Next, the transmit antennas 308 and 309 radiate RF beams having the determined parameters. The RF beams are reflected from targets in and around the ego vehicle's path (e.g., in a 360° field of view) and are received by the transceiver 306. The receive antennas 312 and 313 send the received RF beams to the transceiver 306 for generating the 4D radar data for the perception engine 304 for target identification.

In various examples, the perception engine 304 can store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 can store useful data for radar system 300, such as, for example, information on which subarrays of the transmit antennas 308 and 309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus.

One challenge in deploying beam steering antennas in the analog domain is the trade-off between antenna gain and directivity and side lobe control. Side lobes often represent unwanted radiation in undesired directions and affect the accuracy of the object detection capability of the radar system. In various implementations, side lobe control is provided with a hardware mechanism integrated into at least one element of the beam steering antennas of FIG. 3.

Figure 4:
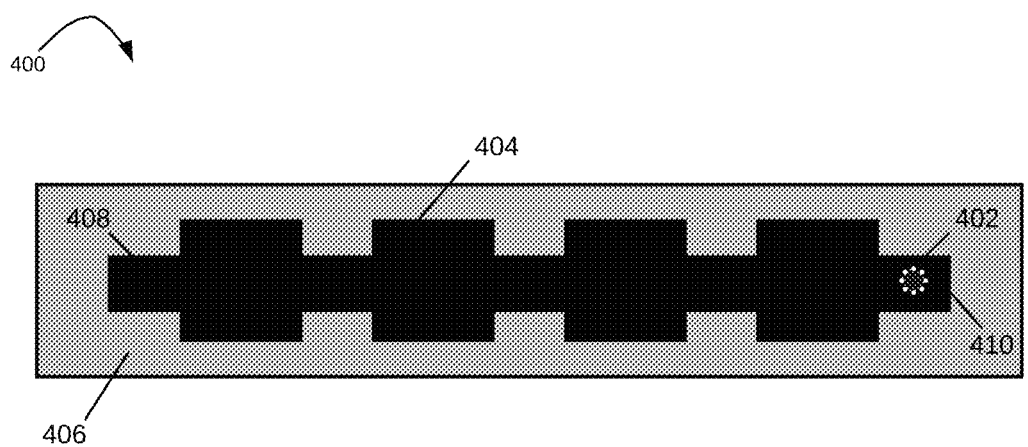
FIG. 4 illustrates a section of a beam steering vehicle radar antenna element having a side lobe reduction mechanism in accordance with one or more implementations of the subject technology.

Attention is now directed to FIG. 4, which illustrates a beam steering vehicle radar antenna element in more detail and in accordance with one or more implementations of the subject technology. Antenna element 400 represents an element of a beam steering antenna in radar 300. As described above, each beam steering antenna in radar 300 may be a meta-structure antenna, a phase array antenna, or any other antenna capable of radiating RF signals in millimeter wave frequencies. In various examples, a beam steering antenna in radar 300 may include 4, 8, 26, 32, 34, 48, 62, or 64 elements, and so on, depending on the desired configuration. The higher the number of antenna elements, the narrower the beam width.

As illustrated, antenna element section 400 has a side lobe reduction mechanism 402, according to various implementations. The antenna element section 400 includes patches 404 formed on substrate 406. The patches 404 are positioned along transmission line 408. The side lobe reduction mechanism 402 is positioned at a terminal end 410 of the transmission line 408. The side lobe reduction mechanism 402 is a conductive contact between the transmission line 408 and a ground or reference layer (not shown in this view). The mechanism 402 acts to reduce the size of the side lobes of the radiation patterns from the patches 404. In various implementations, side lobe reduction mechanism 402 may be present in every antenna element of the beam steering antennas in radar 300. In other implementations, the mechanism 402 may be present in a select set of one or more antenna elements in at least one beam steering antenna in radar 300, depending on the desired configuration.

Figure 5:
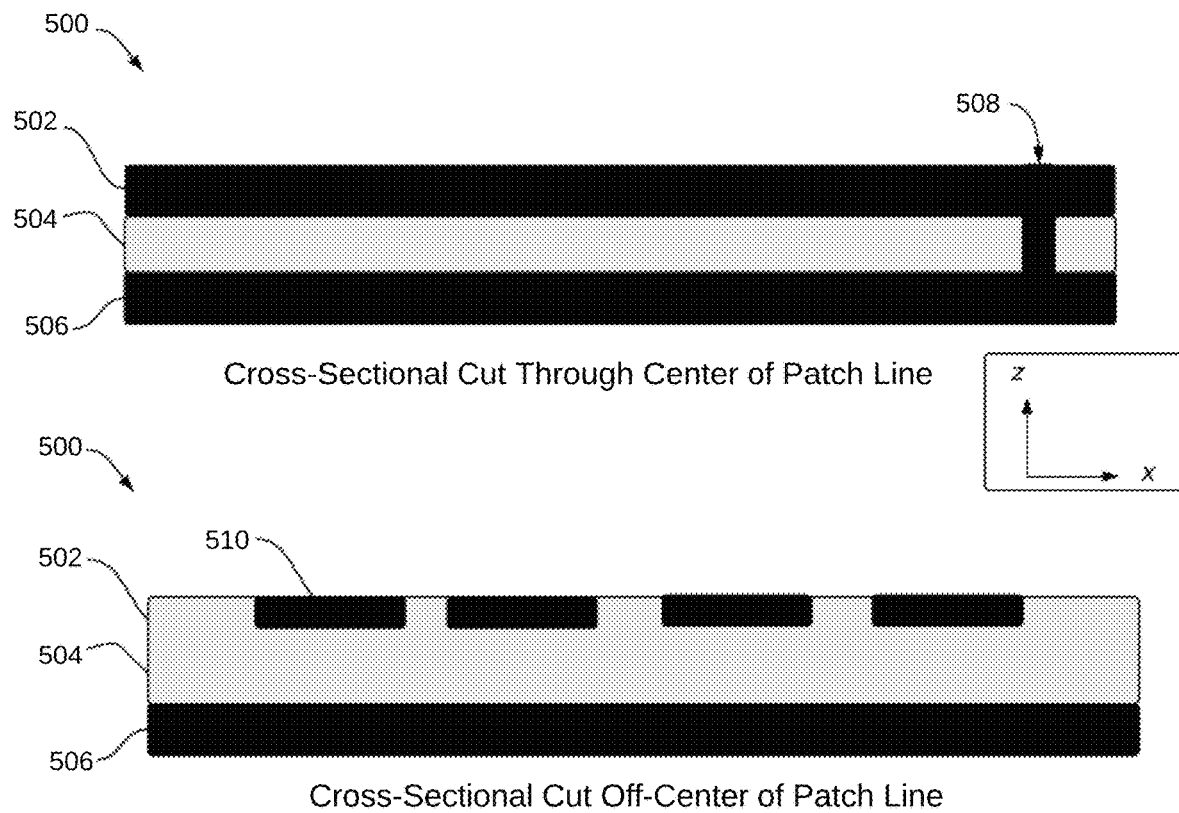
FIG. 5 illustrates cross-sectional views of a beam steering vehicle radar antenna element having a side lobe reduction mechanism in accordance with one or more implementations of the subject technology.
Figure 6:
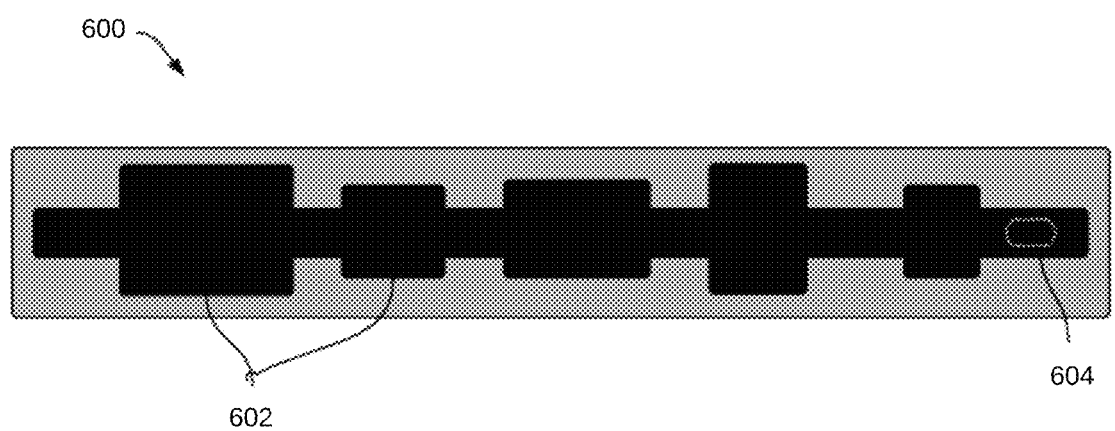
FIG. 6 illustrates another beam steering vehicle radar antenna element having a side lobe reduction mechanism in accordance with one or more implementations of the subject technology.

FIG. 5 illustrates cross-sectional views of a beam steering vehicle radar antenna element having a side lobe reduction mechanism as in FIG. 4. Antenna element 500 is shown in a cross-sectional view that cuts through the center of the transmission line (patch line) 502. The construction of antenna element 500 consists of a conductive layer for transmission line 502 and a ground or reference layer 506 having a dielectric substrate 504 sandwiched therebetween. The side lobe reduction mechanism 508 is positioned at a terminal end of the antenna element 500. FIG. 5 also illustrates a cross-section of a cut made off-center of the transmission line (patch line) 508. Here the shape of the patches 510 is viewed proximate the substrate 504. The side lobe reduction mechanism 508 is not visible as positioned within the middle of the substrate 504. As illustrated, patches 510 are of the same shape and sizes. In various implementations, the patches may also be of different shapes and sizes, such as shown in FIG. 6 with antenna element 600 having a side lobe reduction mechanism 604 and patches 602. Patches 602 are shown as rectangular patches having different dimensions. In other implementations, patches 602 may be of different shapes such as circular patches, depending on the desired configuration.

Figure 7:
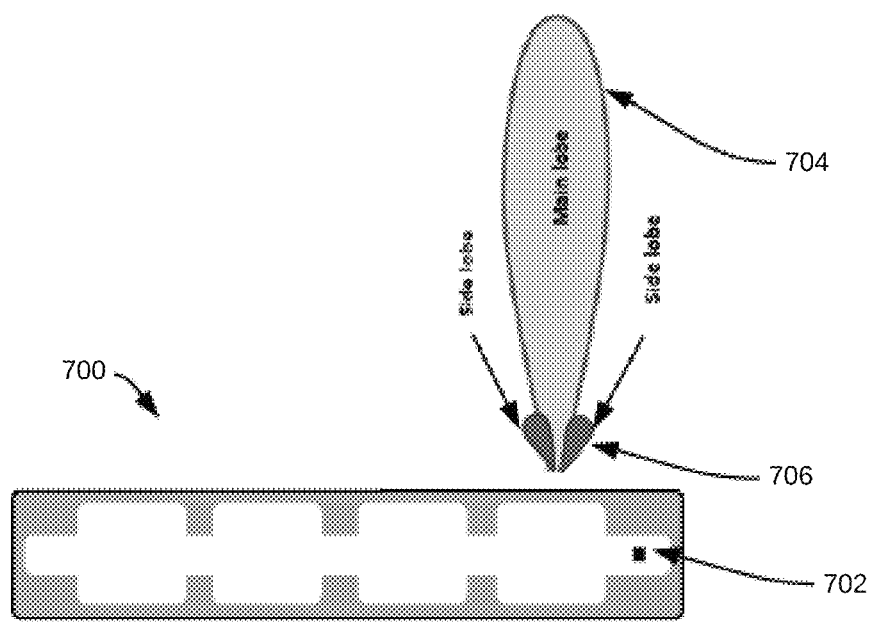
FIG. 7 illustrates a diagram showing the side lobe behavior of an antenna element having a side lobe reduction mechanism in accordance with one or more implementations of the subject technology.

Attention is now directed to FIG. 7, which illustrates a diagram showing the side lobe behavior of an antenna element having a side lobe reduction mechanism in accordance with one or more implementations of the subject technology. The radiation pattern from antenna element 700 has a main lobe 702 and side lobes 702. Antenna element 700 incorporates a side lobe reduction mechanism 560 that results in lower side lobes and better object detection capabilities.

It is appreciated that the beam steering radar system described herein above supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

The previous description of the disclosed examples is provided to enable any person skilled in the art to make or use the present disclosure. Various modifications to these examples will be readily apparent to those skilled in the art, and the m spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A beam steering vehicle radar for object identification, comprising:
    a radar module comprising at least one beam steering transmit antenna configured to radiate one or more radio frequency ("RF") beams in a plurality of directions, at least one beam steering receive antenna configured to receive one or more RF return signals, and a transceiver configured to generate radar data capturing a surrounding environment of an object from the one or more received RF return signals; and
    a perception module configured to detect and identify the object in the surrounding environment from the radar data,
        wherein the at least one beam steering transmit antenna is coupled to the transceiver by a transmission line,
        wherein the transmission line is disposed on a first surface of the substrate and electrically coupled to a ground layer disposed on a second surface of the substrate, the transmission line comprising a side lobe reduction mechanism formed within a thickness of the substrate that reduces side lobes in the radiated one or more RF beams, and
        wherein the side lobe reduction mechanism comprises a conductive contact formed within the substrate, is configured to conductively couple the transmission line to the ground layer, and is positioned at a terminal end of the transmission line.

2. The beam steering vehicle radar for object identification of claim 1, wherein the at least one beam steering transmit antenna comprises a plurality of antenna elements spaced apart in the substrate and the ground layer proximate the substrate, each antenna element comprising a plurality of patches along the transmission line.

3. The beam steering vehicle radar for object identification of claim 1, wherein the at least one beam steering transmit antenna comprises a meta-structure antenna.

4. The beam steering vehicle radar for object identification of claim 1, wherein the radar module further comprises a plurality of phase shifters coupled to the at least one beam steering transmit antenna configured to apply a plurality of phase shifts to the radiated one or more RF beams.

5. The beam steering vehicle radar for object identification of claim 4, wherein the radar module further comprises a field-programmable gate array (FPGA) that provides a series of voltages to the plurality of phase shifters to generate the plurality of phase shifts.

6. The beam steering vehicle radar for object identification of claim 1, further comprising a monopulse module configured to determine angles of arrival for the detection and identification of objects by the perception module.

7. A beam steering vehicle radar for object identification, comprising:
    a radar module comprising at least one beam steering transmit antenna configured to radiate one or more radio frequency ("RF") beams in a plurality of directions, at least one beam steering receive antenna configured to receive one or more RF return signals, and a transceiver configured to generate radar data capturing a surrounding environment of an object from the one or more received RF return signals; and
    a perception module configured to detect and identify the object in the surrounding environment from the radar data,
        wherein the at least one beam steering receive antenna comprises a substrate comprising a conductive transmission line disposed on a first surface of the substrate, a ground layer disposed on a second surface opposite the first surface, and a side lobe reduction mechanism electrically coupling the conductive transmission line to the ground layer through a thickness of the substrate, and
        wherein the side lobe reduction mechanism is configured to reduce side lobes in the one or more RF return signals.

8. The beam steering vehicle radar for object identification of claim 7 wherein the at least one beam steering receive antenna comprises a plurality of antenna elements spaced apart in the substrate with each antenna element comprising a plurality of patches in the conductive transmission line.

9. The beam steering vehicle radar for object identification of claim 7, wherein the side lobe reduction mechanism comprises a conductive contact formed within the substrate coupling the conductive transmission line to the ground layer.

10. The beam steering vehicle radar for object identification of claim 7, wherein the radar module further comprises a plurality of phase shifters coupled to the at least one beam steering receive antenna configured to align the one or more RF return signals that arrive at different times at the least one beam steering receive antenna.

11. The beam steering vehicle radar for object identification of claim 7, wherein the at least one beam steering transmit antenna comprises a side lobe reduction mechanism formed within a substrate of the at least one beam steering transmit antenna that reduces side lobes in the radiated one or more RF beams.

12. The beam steering vehicle radar for object identification of claim 7, further comprising a microcontroller configured to determine a plurality of phase shifts to apply to a plurality of phase shifters coupled to the at least one beam steering transmit antenna.

13. The beam steering vehicle radar for object identification of claim 12, wherein the plurality of phase shifts is determined according to a desired scanning mode based on road and environmental scenarios.

14. The beam steering vehicle radar for object identification of claim 12, wherein the microcontroller is further configured to determine a plurality of scan parameters for the transceiver.

15. The beam steering vehicle radar for object identification of claim 14, wherein the plurality of scan parameters are determined based on an object identification by the perception module.

16. A beam steering vehicle radar for object identification, comprising:
- at least one beam steering receive antenna having a plurality of antenna elements configured to receive one or more RF return signals, comprising:
  - a substrate;
  - a ground layer disposed on a first surface the substrate;
  - a conductive transmission line disposed on a second surface of the substrate opposite the first surface, the conductive transmission line comprising a plurality of patches forming an antenna element in the plurality of antenna elements; and
  - a side lobe reduction mechanism formed within the substrate configured to conductively couple the conductive transmission line to the ground layer, wherein the side lobe reduction mechanism is formed within the substrate in a cross-sectional view and positioned at a terminal end of the conductive transmission line; and
- a perception module configured to detect and identify an object in a surrounding environment of the object from radar data generated from the one or more RF return signals.

17. The beam steering vehicle radar for object identification of claim 16, wherein the side lobe reduction mechanism is configured to reduce side lobes in the one or more RF return signals for object identification by the perception module.

18. The beam steering vehicle radar for object identification of claim 16, further comprising:
- a low noise amplifier (LNA) circuit having a plurality of LNAs, each LNA coupled to each antenna element in the plurality of antenna elements and configured to generate amplified return signals from the one or more RF return signals;
- a plurality of phase shifters configured to apply a plurality of phase shifts to the amplified return signals; and
- a combination network coupled to the plurality of phase shifters configured to combine the amplified return signals.

19. The beam steering vehicle radar for object identification of claim 18, further comprising a transceiver configured to generate the radar data from the combined amplified return signals.

* * * * *